(12) United States Patent
Jacob et al.

(10) Patent No.: US 9,437,207 B2
(45) Date of Patent: Sep. 6, 2016

(54) FEATURE EXTRACTION FOR ANONYMIZED SPEECH RECOGNITION

(71) Applicant: ToyTalk, Inc., San Francisco, CA (US)

(72) Inventors: Oren M Jacob, Piedmont, CA (US); Martin Reddy, San Francisco, CA (US); Brian Langner, Mountain View, CA (US)

(73) Assignee: PULLSTRING, INC., San Francisco, CA (US)

(*) Notice: Subject to any disclaimer, the term of this patent is extended or adjusted under 35 U.S.C. 154(b) by 137 days.

(21) Appl. No.: 13/856,365

(22) Filed: Apr. 3, 2013

(65) Prior Publication Data

US 2014/0278366 A1 Sep. 18, 2014

Related U.S. Application Data

(60) Provisional application No. 61/778,219, filed on Mar. 12, 2013.

(51) Int. Cl.
*G10L 21/013* (2013.01)
*G10L 21/00* (2013.01)
*G10L 21/003* (2013.01)
*G10L 15/26* (2006.01)
*G10L 15/30* (2013.01)
*H04M 1/64* (2006.01)
*G10L 15/02* (2006.01)

(52) U.S. Cl.
CPC ............ *G10L 21/003* (2013.01); *G10L 15/02* (2013.01); *G10L 15/26* (2013.01); *G10L 15/30* (2013.01); *G10L 21/00* (2013.01); *G10L 21/013* (2013.01); *H04M 1/64* (2013.01)

(58) Field of Classification Search
None
See application file for complete search history.

(56) References Cited

U.S. PATENT DOCUMENTS

| 5,911,129 | A | * | 6/1999 | Towell | G10L 13/033 704/223 |
|---|---|---|---|---|---|
| 6,856,960 | B1 | * | 2/2005 | Dragosh | G10L 15/30 704/243 |
| 8,473,451 | B1 | * | 6/2013 | Hakkani-Tur | G06F 21/00 379/201.11 |
| 8,650,035 | B1 | * | 2/2014 | Conway | G10L 21/013 704/10 |
| 2002/0173966 | A1 | * | 11/2002 | Henton | G06F 17/273 704/277 |
| 2012/0201362 | A1 | * | 8/2012 | Crossan | G10L 15/26 379/88.01 |

OTHER PUBLICATIONS

Reynolds et at "Robust Text-independent Speaker Identification Using Gaussian Mixture Speaker Models", IEEE, Trans. SAP Jan. 1995.*
Molau et at "Computing Mel-frequency Cepstral Coefficients on the Power Spectrum", IEEE ICASSP 2001.*
Chaudhari et al (Privacy Protection for Life-log Video, SAFE'07, IEEE Workshop, Nov. 13, 2007, hereinafter Chaudhari).*

(Continued)

*Primary Examiner* — Huyen Vo
*Assistant Examiner* — Yi-Sheng Wang
(74) *Attorney, Agent, or Firm* — Perkins Coie LLP

(57) ABSTRACT

Various of the disclosed embodiments relate to systems and methods for extracting audio information, e.g. a textual description of speech, from a speech recording while retaining the anonymity of the speaker. In certain embodiments, a third party may perform various aspects of the anonymization and speech processing. Certain embodiments facilitate anonymization in compliance with various legislative requirements even when third parties are involved.

22 Claims, 9 Drawing Sheets

(56) References Cited

OTHER PUBLICATIONS

Rahman ("Pitch shifting of voices in real-time", Eng. Report, University of Victoria, Jan. 4, 2008, hereinafter Rahman).*
Darves et al ("Evaluating TTS Voice for Animated Pedagogical Characters", Dept. Computer Science & Engineering, Oregon Health & Science University, Internet archive Jul. 27, 2007, hereinafter, Darves).*
Molau et at ("Computing Mel-frequency Cepstral Coefficients on the Power Spectrum", IEEE ICASSP 2001, hereinafter, Molau).*
Eide et al ("A Parametric Approach to Vocal Tract Length Normalization", IEEE ICASSP 1996, hereinafter Eide).*
Zhang et al ("Voice disguise and automatic speaker identification", Dept. Forensic Science, China Criminal Police University, Jul. 23, 2007, hereinafter, Zhang).*
Molau et al "Computing Mel-frequency Cepstral Coefficients on the Power Spectrum", IEEE ICASSP 2001 W Eide et al "A Parametric Approach to Vocal Tract Length Normalization", IEEE ICASSP 1996.*
Darves, et al "Evaluating TTS Voices for Animated Pedagogical Characters", Archived version of Jul. 27, 2007.*
Eide et al "A Parametric Approach to Vocal Tract Length Normalization", IEEE ICASSP 1996.*
Chauhari et al "Privacy Protection for Life-log Video" Signal Prcessing Application for Public Security and Forensics, IEEE Apr. 11-13, 2007.*
Zhang, et al "Voice disguise and automatic speaker recognition", available online at www.sciencedirect.com Jul. 23, 2007.*
Rahman "Pitch shifting of voices in real-time" Engineering Report, University of Victoria, Jan. 4, 2008.*

* cited by examiner

FEATURE EXTRACTION FOR ANONYMIZED SPEECH RECOGNITION

CROSS-REFERENCE TO RELATED APPLICATIONS

This application claims priority and the benefit of U.S. Provisional Application 61/778,219, entitled FEATURE EXTRACTION FOR ANONYMIZED SPEECH RECOGNITION filed on Mar. 12, 2013.

FIELD OF THE INVENTION

Various of the disclosed embodiments relate to systems and methods for extracting user information from a speech recording while retaining the anonymity of the user, sometimes while working with a third party in compliance with legislative requirements.

BACKGROUND

Various regulatory agencies are working to protect the privacy of online users, particularly children, by imposing certain guidelines regarding the acquisition and storage of speech data. For example, the FTC's recent implementation of the Children's Online Privacy and Protection Act (COPPA) concerns itself in part with children under 13 years old. Changes to the Act may require that audio files that contain a child's voice be considered "personal information" deserving of special protection. Companies which provide child-oriented applications, such as entertainment applications, may need to gather consent from parents before letting children use their service, particularly where the service acquires and processes personal information in the course of entertaining the child audience.

Legislation, such as COPPA, may require that consent be acquired in one of two categories: "rigorous" and "mild". Rigorous forms of consent may include, e.g., processing a credit card payment, maintaining a call center for parents to contact, requiring a parent to print, sign, and mail a physical approval form, etc. Mild forms of consent may include, e.g., "email plus" activities. COPPA's "email plus" method allows a company to request (in the direct notice to the parent) that the parent provide consent in an email message. For various business and growth reasons, including potentially offering customers a free trial to their services, many organizations may prefer to gather consent via a mild method, such as the "email plus" method.

Legislation such as COPPA is also concerned with the "disclosure" of personal information, and may compel companies to use the more rigorous forms of consent when personal information is shared with third parties. However, there is an important exception (16 C.F.R. 312.2. "disclosure"0.1) that allows companies to implement consent via "email plus" as long as a third party provider is only using the information for supporting the internal operations of the company's online service.

Accordingly, there exists a need for systems and methods which comply with the legislative changes, while providing the functionality necessary to perform certain interactive operations.

SUMMARY

Certain embodiments contemplate a computer-implemented method for speech data processing comprising: receiving a raw waveform containing speech data of a user; providing the raw waveform to a third party processing system; directing the third party processing system to perform an operation upon the waveform, the operation making identification of the user from the waveform more difficult; and receiving a textual depiction of speech from the third party system.

In some embodiments, making identification of the user from the waveform more difficult comprises rendering at least one technique for identifying the user from the waveform less effective in identifying the user. In some embodiments, the plurality of features in the waveform to be redacted comprise frequency components. In some embodiments, directing the third party processing system to perform an operation comprises identifying features in the waveform for the third party system to redact. In some embodiments, the identified features comprise frequency components. In some embodiments, identifying features in the waveform comprises providing metadata with the raw waveform to the third party system, the metadata identifying the plurality of features in the waveform to be redacted. In some embodiments, the third party processing system comprises a speech processing software module. In some embodiments, the third party processing system comprises a server computer. In some embodiments, the textual depiction comprises a string of characters. In some embodiments, the textual depiction includes a Natural Language Processing (NLP) description.

Certain embodiments contemplate a computer-implemented method for processing speech data comprising: receiving a raw waveform containing speech data of a user; generating an anonymized intermediate representation of the speech data based on the raw waveform; and determining a plurality of textual speech data based on the anonymized intermediate representation.

In some embodiments, generating an anonymized intermediate representation of the speech data comprises transmitting the anonymized intermediate representation to a processing system operated by a third party. In some embodiments, generating an anonymized intermediate representation comprises generating a spectral decomposition of the raw waveform and removing at least one frequency component. In some embodiments, generating an anonymized intermediate representation comprises generating a feature vector representation of a plurality of frequencies derived from the raw waveform. In some embodiments, determining a plurality of textual speech data comprises generating an NLP description of at least a portion of the waveform.

Certain embodiments contemplate a computer-implemented method for anonymizing speech data comprising: receiving a raw waveform containing speech data of a user; segmenting the raw waveform into a plurality of intervals; calculating a frequency domain representation of each interval; applying a post-processing function to smooth the frequency representation; extracting features from at least one of the plurality of intervals; and providing the features for processing by an analysis system.

In some embodiments the method further comprises performing at least one of noise removal, speaker removal, or vocal tract length normalization. In some embodiments, the post-processing function removes at least a portion of speaker identifying data from the waveform. In some embodiments, the post-processing function comprises the addition of certain nonspecific components into the waveform data. In some embodiments, extracting the features comprises analyzing data provided from a speech database.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
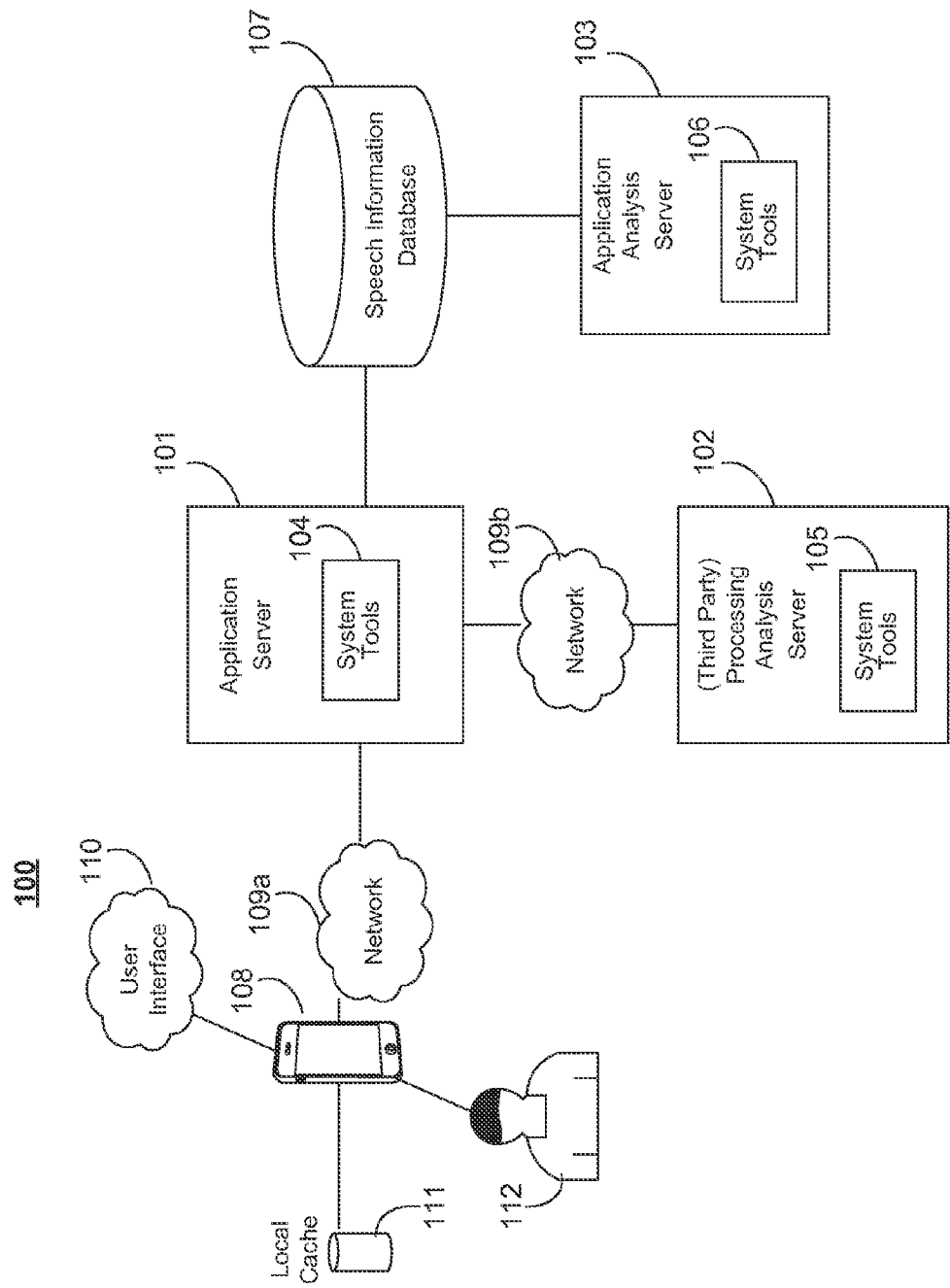
FIG. 1 illustrates a general network topology of certain embodiments of the system.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System Overview

Certain of the present embodiments contemplate anonymization methods for software products, e.g., software products for mobile devices aimed at the family entertainment market. Certain of these embodiments may employ cloud-based speech recognition of children and adults as part of the runtime experience offered by the product.

For conversational entertainment, speech recognition (e.g., the identification of words in speech) may be fundamental to the internal operations of the application providing the entertainment. The designer, or implementer, of the application system may desire to use "email plus" consent if the system engages a third party as a speech recognition provider and the information is only used for the limited purpose of speech recognition. By anonymizing user data, in certain embodiments it may not be necessary to acquire "rigorous" consent, or any consent at all, to achieve legislative compliance.

However, it may also be common for third party speech recognition providers to want to capture and maintain large libraries of voice recordings to improve their recognition capabilities and to help develop new speech recognition products. These new products may then be offered to the market at large. Since legislation, such as that described above, may consider an audio file of a child's voice to be "personal information", the third party speech recognition provider's desire to keep recordings of children's voices for future use may require the application system to first gather consent through one of the "rigorous" methods.

To avoid these difficulties, certain embodiments contemplate systems and methods to recognize, and to perform operations based upon speech without using and/or retaining raw audio files provided by users. Both the application system and the third party may benefit since the application system would not be "disclosing" any personal information to the third party. Without the acquisition and distribution of personal information, legislation, such as COPPA, would not require the more rigorous consent.

Accordingly, certain embodiments recognize what a child is saying in a runtime experience, such as a conversational system wherein the child engages in conversation with a plurality of synthetic characters, without using or storing raw audio files that contain that child's voice.

FIG. 1 illustrates a general network topology of certain embodiments of the system. In these embodiments, an application server 101 may host a service to run an entertainment program, such as a conversational dialogue with a plurality of synthetic characters, on a user device 108 via a network 109a. Application server 101 may provide assets and instructions to a program running on user device 108. Networks 109a and 109b may be the same network, such as the Internet, or different networks, such as a local area network and the Internet. Application server 101 may send data to user device 108, so that user device 108 may execute the dialogue through a web browser, a stand-alone application, etc. In some embodiments, application system 101 may not be located on a server system across a network 109a, but may instead be located on user device 108. System tools 104 may include a plurality of software programs to implement various aspects of the disclosed embodiments and to maintain operation of the server 101. User device 108 may include a mobile phone, table PC, desktop computer, laptop computer, internet connected TV set, etc. The user device 108 may be located in a kiosk, e.g. at a hospital or nursery, or may be part of an entertainment system in a home, or in a minivan, etc. As used herein, the "application system" may refer to the application server 101, speech information database 107, application analysis server 103, and the application running on user device 108, together as a whole, or with reference to only one or more of these elements, depending on the embodiment discussed. In some embodiments, these individual elements may be grouped together into fewer than all the depicted devices. For example, in some embodiments the operations of the application server 101 and/or database 107 and/or application analysis server 103 may be performed on user device 108.

As the user 112 responds in the dialogue, the user interface 110 may record the user's responses and transmit them to the application server 101 or directly to the processing analysis server 102. Processing analysis server 102 may be run by a third party separate from the party in control of application server 101 and the conversation application running locally on user device 108. For example, the company running processing analysis server 102 may be a third party service provider dedicated only to speech recognition. The application server 101 or application running on user device 108 may transmit audio files of the user's voice to the processing and analysis server 102. The processing may, for example, convert the audio to a Natural Language Processing (NLP) format upon which subsequent analysis may be performed. Following processing, the processing analysis server 102 may transmit the processed data back to application server 101 or directly to speech information database 107, application analysis server 103, or in some embodiments to user device 108. Application server 101 may use the processed information to prepare a response to the user at the user interface 110. For example, having determined the words spoken by the user 112 in response to a query, a program running on application server 101 or on user device 108 may determine an appropriate response and deliver the response to the user 112 via one or more of the synthetic characters depicted on user device 108.

An application analysis server 103 may perform an analysis of the processed audio data, possibly "offline" and not in real-time during the conversational interaction between the user 112 and synthetic characters. For example, where the processed audio data includes NLP information, the system may apply an Artificial Intelligence engine or Machine Learning method, to extract statistical data. In some embodiments, the NLP or speech recognition information may be used directly by application server 101 or user device 108 to inform the operation of the conversational dialogue application running on user device 108.

Application Interface

Figure 2:
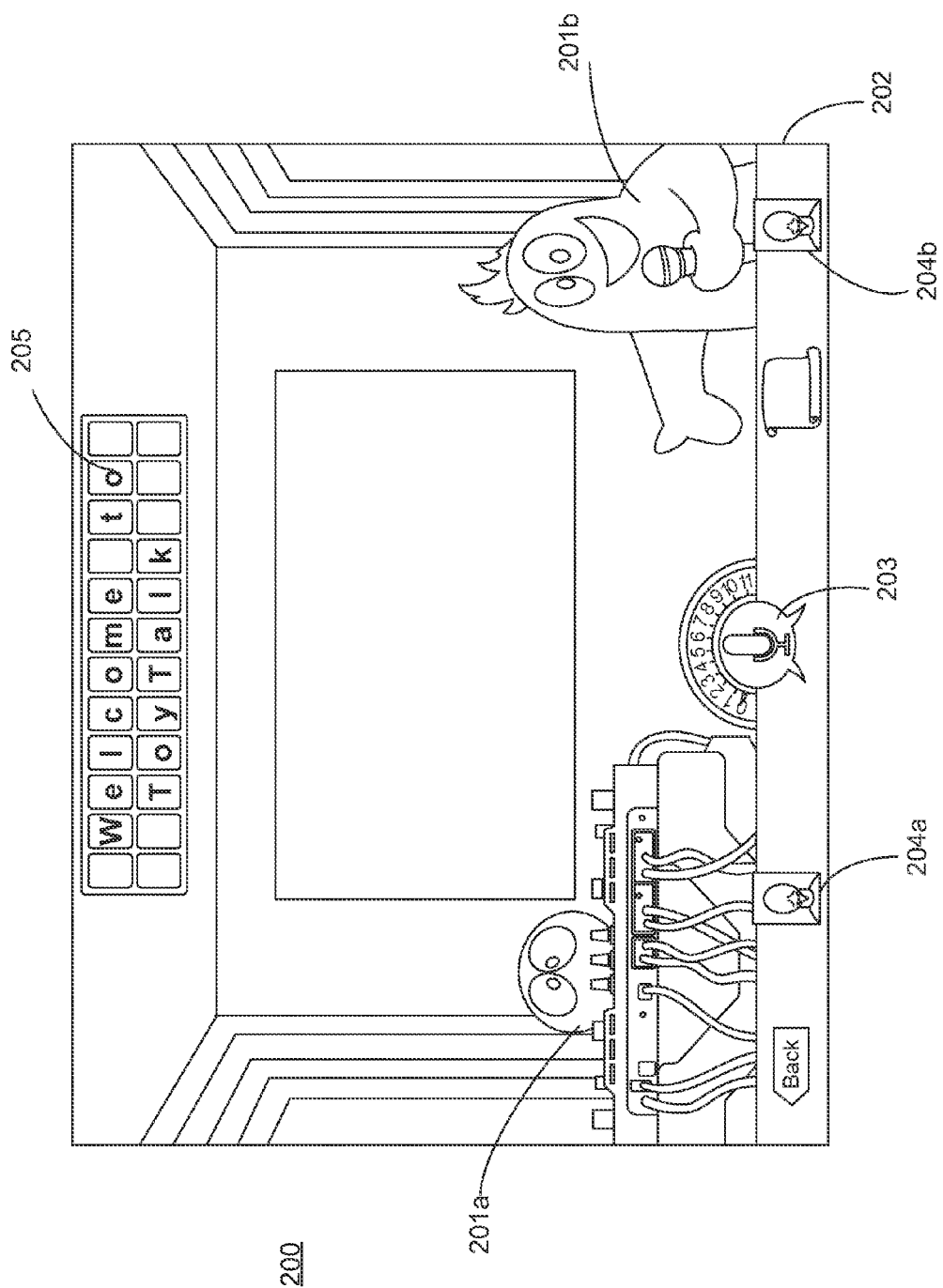
FIG. 2 illustrates an example screenshot of a graphical user interface (GUI) of a virtual environment as may be implemented in certain embodiments wherein a user may engage in an oral dialogue with synthetic characters via a user device.

FIG. 2 illustrates an example screenshot of a graphical user interface (GUI) 200 of a virtual environment as may be implemented in certain embodiments. In some embodiments, the GUI 200 may appear on an interface 110 of the user device 108, such as on a display screen of a mobile phone, or on a touch screen of a mobile phone or of a tablet device. As illustrated in this example, the GUI 200 may include a first 201a depiction of a synthetic character, a second 201b depiction of a synthetic character, a menu bar 202 having a user graphic 204a, a real-time user video 204b, and a speech interface 203. Through interaction with synthetic characters in the GUI, a user may engage in a conversational dialogue. The user's oral responses and statements may be transmitted by the user device 108 to application server 101.

Menu 202 may depict speech tools available to the user. Speech interface 203 may be used to respond to inquiries from synthetic characters 201a-b. For example, in some embodiments the user may touch the interface 203 to activate a microphone to receive their response. In other embodiments the interface 203 may illuminate or otherwise indicate an active state when the user selects some other input device. In some embodiments, the interface 203 may illuminate automatically when recording is initiated by the application running on the user device 108.

In some embodiments, real-time user video 204b depicts a real-time, or near real-time, image of a user as they use a user device, possibly acquired using a camera in communication with the user device. As indicated in FIG. 2, the depiction of the user may be modified by the system, for example, by overlaying facial hair, wigs, hats, earrings, etc. onto the real-time video image.

Synthetic characters 201a-b may perform a variety of animations, both to indicate that they are speaking as well as to interact with other elements of the virtual environment. Through these interactions synthetic characters 201a-b may encourage the user to participate in dialogue with them and to provide auditory responses through the interface 203. The system may transmit these audio responses to application server 101 for processing and response. In some embodiments the applications operating on application server 101 are instead operating locally on user device 108, and the processing may accordingly take place there.

User Interaction

Figure 3:
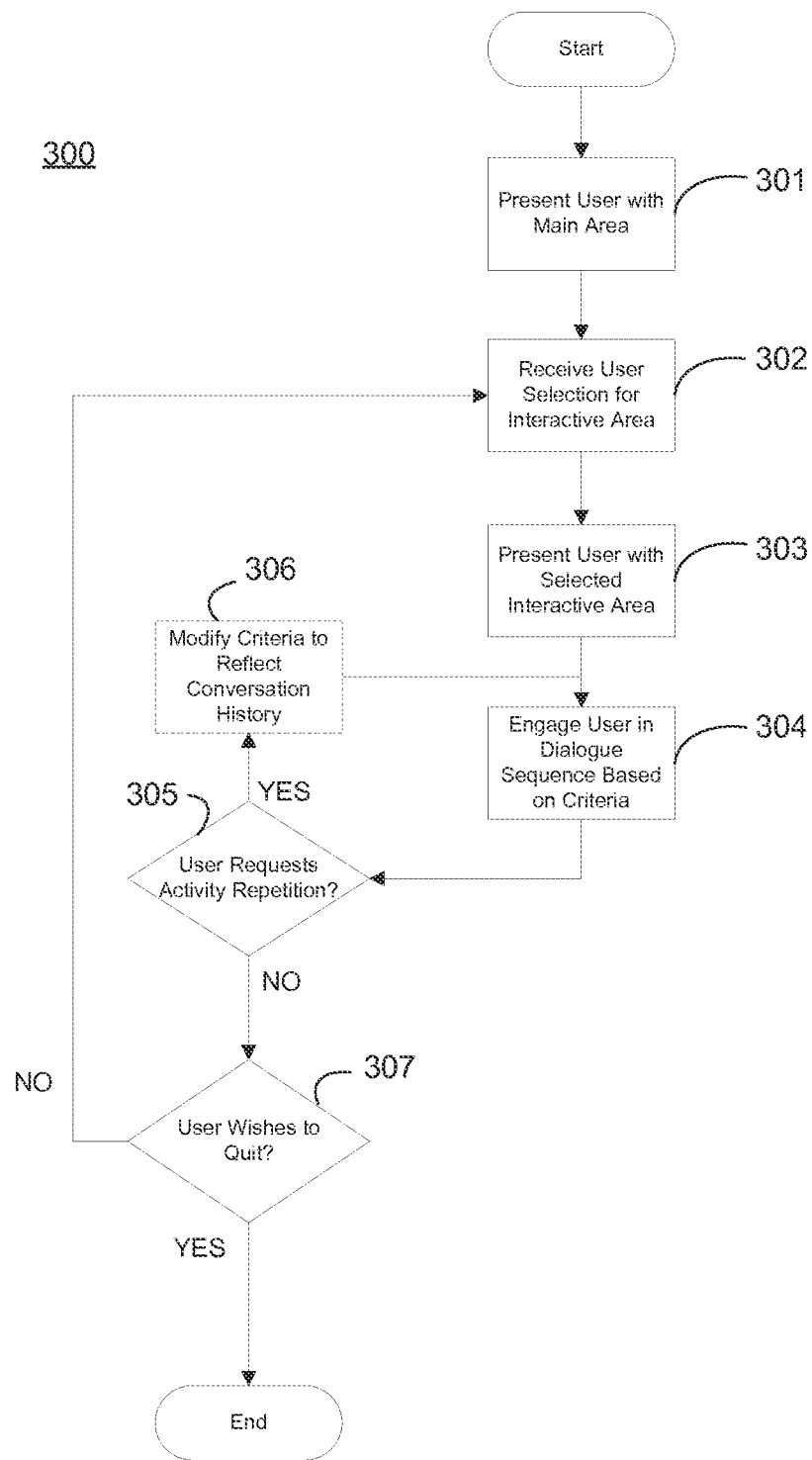
FIG. 3 is a flowchart depicting certain steps in a user interaction process with the virtual environment, and engaging in dialogue between a user and one or more synthetic characters, as may be implemented in certain embodiments.

FIG. 3 is a flowchart depicting certain steps in a user interaction process 300 with the virtual environment as may be implemented in certain embodiments. The process 300 may be implemented on the user device 108 or on application server 101 in certain embodiments. At step 301 the system may present the user with a virtual environment, such as an environment depicted in FIG. 2. The virtual environment may be divided into a plurality of areas, where each area offers unique conversational interactions between the user and synthetic characters. At step 302, the system may receive a user selection for an interactive area. In some instances, the input may comprise a touch or swipe action relative to a graphical icon, but in other instances the input may be an oral response by the user, such as a response to an inquiry from a synthetic character (e.g., "Where would you like to go?"). At step 303, the system may present the user with the selected interactive area.

At step 304, the system may engage the user in a dialogue sequence based on criteria. The criteria may include previous conversations with the user and a database of statistics generated based on social information or past interactions with the user. The criteria may be statistics that have been generated based on an analysis of content in speech information database 107. At step 305, the system may determine whether the user wishes to repeat an activity associated with the selected interactive area. For example, a synthetic character may inquire as to the user's preferences. If the user elects, perhaps orally or via tactile input, to pursue the same activity, the system may repeat the activity using the same criteria as previously, or at step 306 may modify the criteria to reflect the previous conversation history.

Alternatively, if the user does not wish to repeat the activity the system can determine whether the user wishes to quit at step 307, again possibly via interaction with a synthetic character. If the user does not wish to quit the system can again determine which interactive area the user wishes to enter at step 302.

Anonymization Overview

Some legislation, such as COPPA, considers any audio file that contains child speech to be personal information. Various embodiments therefore propose that audio files be transformed into a different form before they are used by the application system or by a third party to make the third party's own audio models. This different form may not be an audio format and it may not be possible to revert the data back to the original audio waveform. In this manner, certain embodiments may remove personal information from the data as defined by COPPA, because the file would not be one from which all the original audio data, particularly data concerning identity, could be reproduced. Certain embodiments may remove, alter, substitute, or destroy elements of the original, raw audio file to accomplish the anonymization.

Figure 4:
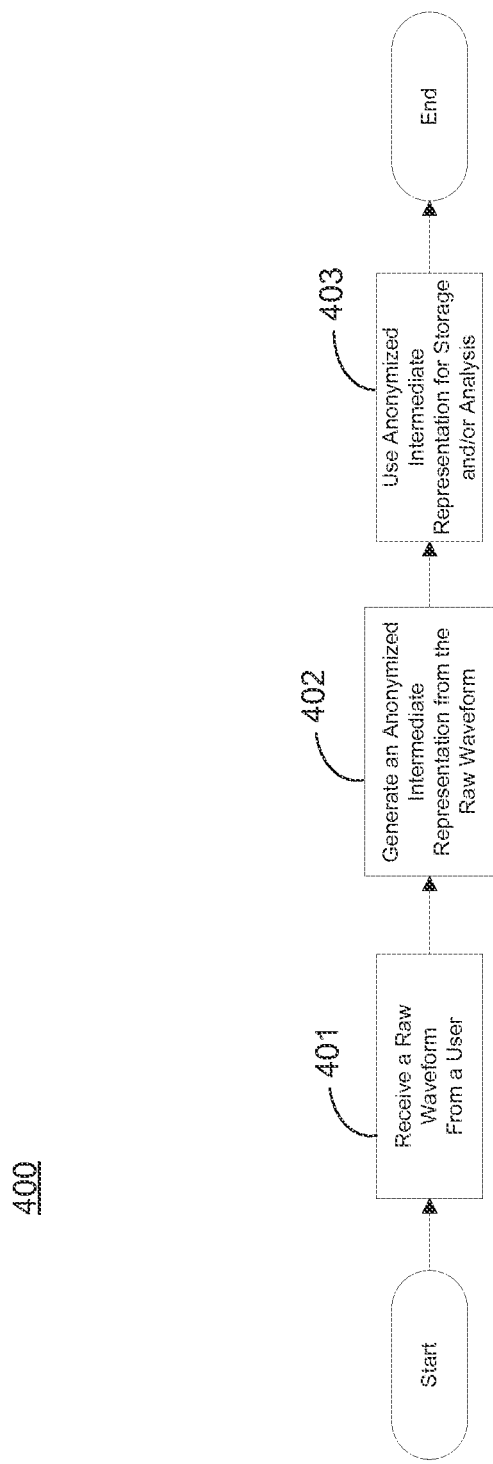
FIG. 4 illustrates a process flow diagram for a method to generate anonymized speech data in certain embodiments.

FIG. 4 illustrates a process flow diagram for a method to generate anonymized speech data in certain embodiments. At step 401 the system may receive a raw waveform from a user, such as receiving a waveform at the user device 108 or at the application server 101. At step 402, the system may then generate an anonymized intermediate representation from the raw waveform. At step 403, the system may then use the anonymized intermediate representation for storage and/or analysis and/or for processing by a third party. The anonymized intermediate form may be the form provided to a third party system, such as processing analysis server 102.

Anonymization in the Processing Pipeline

Certain embodiments contemplate performing these anonymization operations as part of one or more speech processing operations, e.g. a speech recognition process, such as a speech audio to speech text conversion process. In some embodiments, the speech processing operations may be performed within the same system performing the character animations and entertainment application, e.g., user device 108 or at the application server 101. In certain embodiments, a third party service, dedicated to speech processing may receive the acquired waveforms and return textual or other post-processed versions of the audio file. The system or the third party may desire to use the audio data to build derivative acoustic models for their speech recognition service.

The first phase of a speech recognition process may include the performance of feature extraction, which may involve converting the waveform data into the frequency domain and extracting key frequencies. This may have the effect of transforming the data into a non-audio file format, e.g. a format which is not based on a time-sequence of values. This phase of feature extraction may also destroy most of the frequency content of the recording, making it impossible to exactly reconstruct the original waveform or to reconstruct the original waveform sufficiently to identify an individual by their voice.

Certain embodiments therefore contemplate that the application system, or the third party speech processing service, use the feature extracted frequency information, instead of original audio files, for the purposes of building acoustic models. Such an operation would be in agreement with legislative mandates. Furthermore, in some embodiments the system may specify certain features be retained from the audio file, which facilitate various post-processing operations, e.g. identifying emotional cues, without retaining sufficient information to reconstruct the raw audio file and/or to determine a speaker's identity. In this manner, these embodiments may address privacy concerns over the use of audio data collected from children, while still acquiring sufficient information for a data intensive dialogue-based entertainment system.

Anonymization in the Processing Pipeline—Application System Based Anonymization

Figure 5:
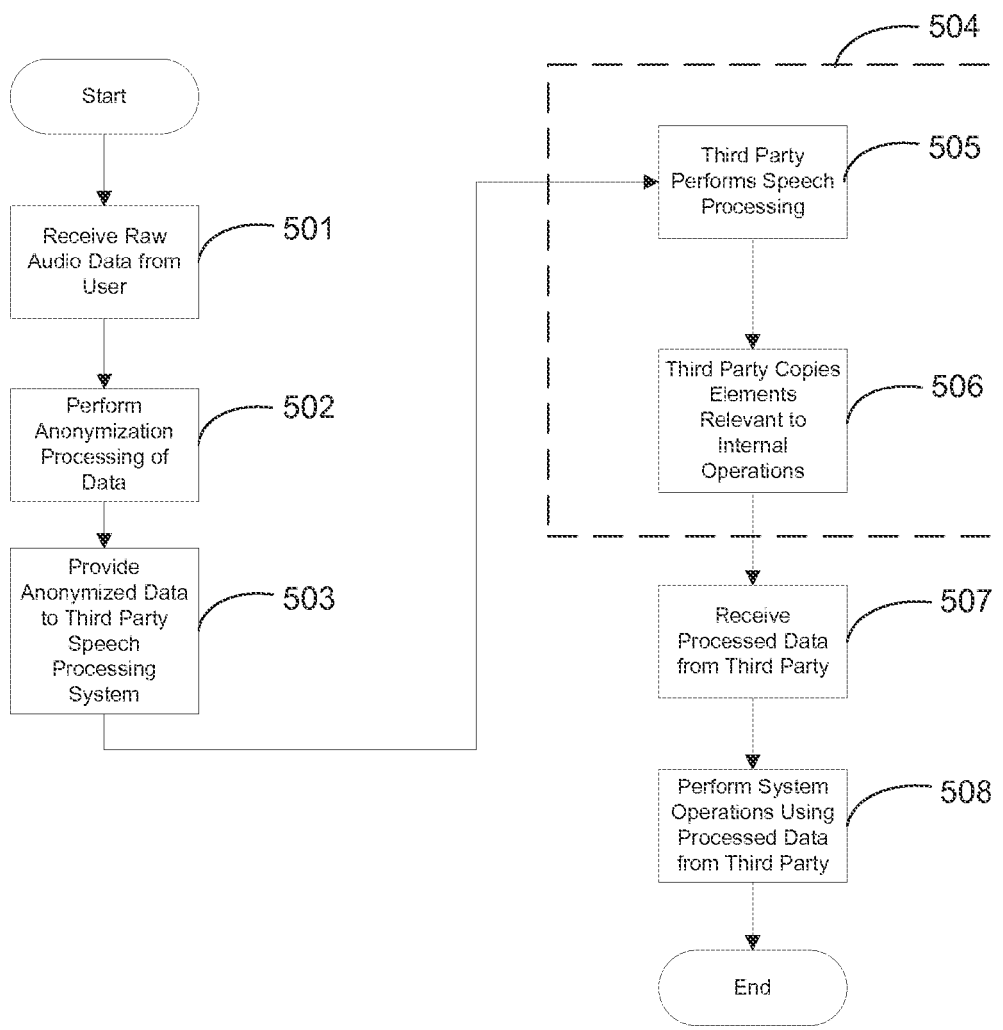
FIG. 5 illustrates a flow diagram for a process, involving a third party in part, that analyzes and anonymizes a raw speech waveform, as may be implemented in certain embodiments.
Figure 6:
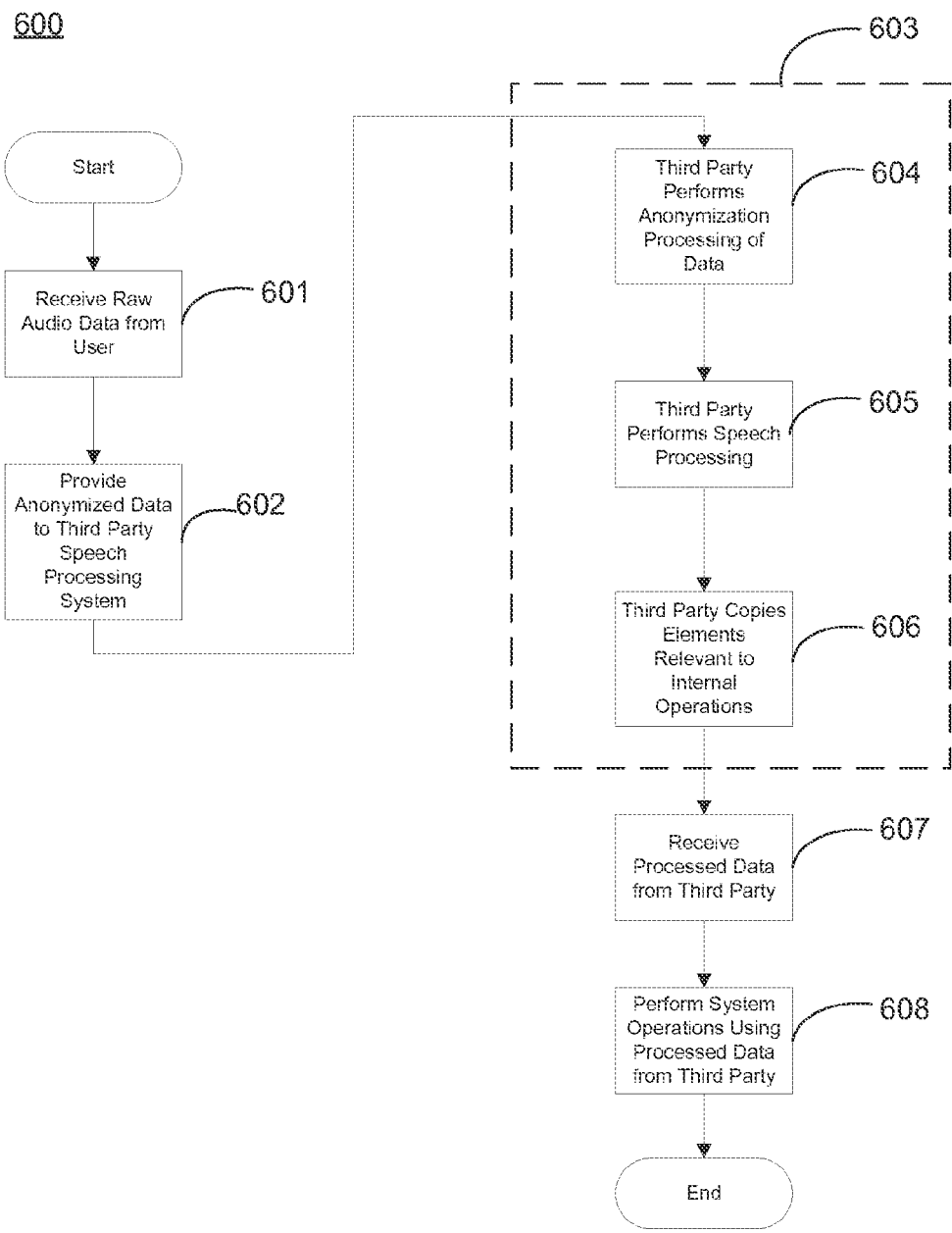
FIG. 6 illustrates a flow diagram for a process, involving a third party in part, that analyzes and anonymizes a raw speech waveform, as may be implemented in certain embodiments.

In some embodiments, the application system may perform feature extraction first and may then only send the third party the extracted data. The third party data could then be used to make acoustic models both for the system and for the third party's own use. In some situations, this approach may be preferred because the third party never receives any audio files (and hence never receives any personal information) in the first place. In the examples of FIGS. 5 and 6, and the corresponding embodiments, the operator of the application system may take advantage of the COPPA exception that allows a company to acquire consent via "email plus", because the third party provider is only using the information for supporting the internal operations of the company's online service or because the third party receives only anonymized data.

FIG. 5 illustrates a flow diagram for a process 500, involving a third party in part, that analyzes and anonymizes a raw speech waveform, as may be implemented in certain embodiments. At step 501 the system may receive raw audio data from a user. For example, the system may receive audio at a microphone attached to a user device 108 or the server system 101 may receive a waveform of the captured audio from a user device.

At step 502, the system may perform anonymization processing of the raw audio waveform. For example, the system may convert the raw waveform to a frequency representation and remove specific frequencies that could be used to identify a user. In some embodiments, the system may convert the result back to a time-based file. Certain methods for anonymizing speech data are discussed in greater detail herein.

At step 503, the system may provide the anonymized data to a third party speech processing system. For example, the system may transmit the data to a separately located server, such as processing analysis server 102. In some embodiments, the third party may provide an interface, or a local processing module or application, that can be included on application server 101. Accordingly, in some embodiments though the data may not physically leave server 101, the data may enter into the control of an application operated by a third party.

Steps 505 and 506 may be part of third party based operations 504 which are not in the direct control of the application system(s), or the operator of the application system(s), performing the remaining steps of the process. Third party based operations 504 may be performed on a separate system, e.g. analysis server 102, or as part of a local interface or program provided by the third party. In either instance, in the depicted example the application system receiving the waveform has surrendered control of a portion of the waveform (or a copy of a portion of the waveform) to the third party for third party based operations 504.

In some embodiments, the third party and the operator of the application system may have negotiated a protocol for providing anonymized waveforms to the third party system. For example, after converting the waveform to a frequency representation at step 502, the application system may not convert the waveform back to a time-based representation, but may provide the frequency version to the third party system. The third party system, anticipating that the waveform will abide by the agreed protocol, may perform operations 505, 506 upon the waveform assuming the waveform comprises frequency-based data. The third party system may also be informed by the application server of the character of the components that were removed from the frequency-based data as part of process step 502 (e.g., as part of the protocol or by transmitting accompanying metadata).

At step 505, the third party system may perform speech processing services, for example, identifying NLP and/or textual elements using a Hidden Markov Model, etc. In some embodiments, the identified NLP and/or textual elements may also be specified in a protocol determined between operators of the application system and operators of the third party system or in metadata provided from the application system with the waveform to the third party system.

At step 506, the third party system may copy elements relevant to internal operations of the third party's business. For example, the third party may wish to build derivative acoustic models for their speech recognition service. While these models may be retained for the third party's use, in some embodiments the third party may deliver these models, or other determined information, to analytics server 103 which may be in communication with, or the same as, application server 101. This data may be included as part of analysis server 103's study of the speech information database 107. In some embodiments, pursuant to the agreed protocol, the third party may adjust the operation of step 506 as compared to waveforms received from other than the application system. For example, the adjustments may be performed in view of the anonymization processing performed at step 502. The anonymization performed by the application system may be of a different character or quality from the operations performed by other systems. In some embodiments, the application system may describe aspects of the processing at step 502 to the third party system using metadata or specifications in the agreed protocol.

At step 507, the system, e.g. application server 101, may receive the processed data from the third party and at step 508 may perform system operations using the processed data from the third party. For example, the processed data may include a textual version of the speech in the raw audio waveform. The application server 101, or user device 108, may perform natural language processing, artificial intelligence, and/or machine learning techniques upon this textual data. From the analysis, the server 101, or user device 108, may determine a responsive action, such as, e.g., directing a synthetic character at the user device 108.

The system operations performed at 508, may include transmitting data to speech information database 107 or application analysis server 103.

Anonymization in the Processing Pipeline—Third Party Based Anonymization

In another disclosed approach the third party may perform the anonymization of the data, e.g. feature extraction. The third party may be expressly contracted to perform anonymization of the application system or may perform the anonymization as part of the third party's operations performed on behalf of all its customers. An agreement may make it clear that any use of the audio files is solely for the purpose of doing the data extraction for the implementer of the application system and for no other purpose. However, in either this embodiment or the embodiment described in relation to FIG. 5, once the data is anonymized, the implementer of the application system could then license or sell the anonymized data to the third party to use however it wishes. As the extracted data contains no personal information the data would not run afoul of the privacy protection legislation. Here, in the example of FIG. 6 the third party would receive personal information when it receives the audio files to do the extraction, but only in its role of providing support for the internal operations of the implementer of the application system.

FIG. 6 illustrates a flow diagram for a process 600, involving a third party in part, that analyzes and anonymizes a raw speech waveform, as may be implemented in certain embodiments. At step 601 the system may receive raw audio data from a user. For example, the system may receive audio at a microphone attached to a user device or the server system 101 may have received the waveform from a user device.

At step 602, the system may provide the anonymized data to a third party speech processing system. For example, the system may transmit the data to a separately located server, such as processing analysis server 102. In some embodiments, the third party may provide an interface, or a local processing system, that can be included on server 101. Accordingly, in some embodiments though the data may not physically leave server 101, the data may enter into the control of an application, or module, operated by a third party.

Steps 604-606 may be part of third party based operations 603. Like third party operations 504, these steps may be performed on a separate system, e.g. analysis server 102, or as part of a local interface or program provided by the third party. In some embodiments, the third party and the operator of the application system may have negotiated a protocol for providing anonymized waveforms to the third party system.

At step 604, the system may perform anonymization processing of the raw audio waveform. As discussed in greater detail herein, this processing may occur normally in the third party's processing operations, for example, during conversion to a frequency domain representation and removal of selected frequencies. Certain of the anonymizing operations may be specified by the application system, either previously, via contract or protocol, or by the application system including metadata with the raw audio, specifying which elements are to be redacted. The system may convert the raw waveform to a frequency representation, remove specific frequencies that could be used to identify a user, and convert the result back to a time-based file. Certain methods for anonymizing speech data are discussed in greater detail herein.

At step 605, the third party system may perform speech processing services, for example, identifying NLP and/or textual elements using a Hidden Markov Model, etc. As discussed above, in some embodiments, the identified NLP and/or textual elements may also be specified in a protocol determined between operators of the application system and operators of the third party system or in metadata provided from the application system with the waveform to the third party system.

At step 606, the third party system may copy elements relevant to internal operations. For example, the third party may wish to build derivative acoustic models for their speech recognition service. While these models may be retained for the third party's use, in some embodiments the third party may deliver these models, or other determined information, to analytics server 103 which may be in communication with, or the same as, application server 101. This data may be included as part of analysis server 103's study of the data in speech information database 107.

At step 607, the system, e.g. application server 101, may receive the processed data from the third party and at step 608 may perform system operations using the processed data from the third party. For example, the processed data may include a textual version of the speech in the raw audio waveform. The application server 101, or user device 108, may perform natural language processing, or similar analysis, of this textual data. From the analysis, the server 101, or user device 108, may determine a responsive action, such as, e.g., directing a synthetic character at the user device 108.

The system operations performed at step 608, may include transmitting data to speech information database 107 or application analysis server 103.

In addition to the operations depicted in FIGS. 5 and 6, the system may transcribe all audio files before making them available to the third party. As part of this process, the system may remove any files, or portions of files, that contain personal information that is uttered verbally by the child/user. Such portions may be recognized using textual analysis, e.g. Bayesian methods as applied to contextual identification. This step may further ensure that the third party will not be exposed to personal information as defined by legislation such as COPPA.

Feature Extraction Overview

In some embodiments, generation of an anonymized intermediate representation at step 402 of process 400 may include conversion of the raw audio waveform to a form possessing a plurality of "features", e.g. frequency components following a Fourier Transform, principal components following a decomposition, etc. These features may then be identified for significance and relevance to post-processing, and those elements relevant to processing retained, while the other elements, including elements which could be used to recover identity information regarding the speaker, are removed. As discussed above, certain speech processing operations may inherently remove certain of the personally identifying qualities of the speech waveform. Accordingly, anonymization methods at step 402 may build upon these speech processing operations and remove features associated with personal identification that were not previously redacted by the speech processing operations.

In some embodiments, a speech recognition system may be based on a Hidden Markov Model (HMM) where the speech waveform is viewed as a piecewise linear signal. The first stage of a recognition process may be to calculate this sequence of signals for the HMM. This first stage may be called feature extraction.

At a high level, feature extraction may involve taking the raw speech waveform and converting the waveform from the time domain into the frequency domain, then building a feature vector by finding the major frequency peaks at regular intervals. In some embodiments an alternative feature identification method, such as Principal Component Analysis, Support Vector Machines, etc. may be used. The feature vector may then be passed to the HMM stage of the recognition process.

Figure 7:
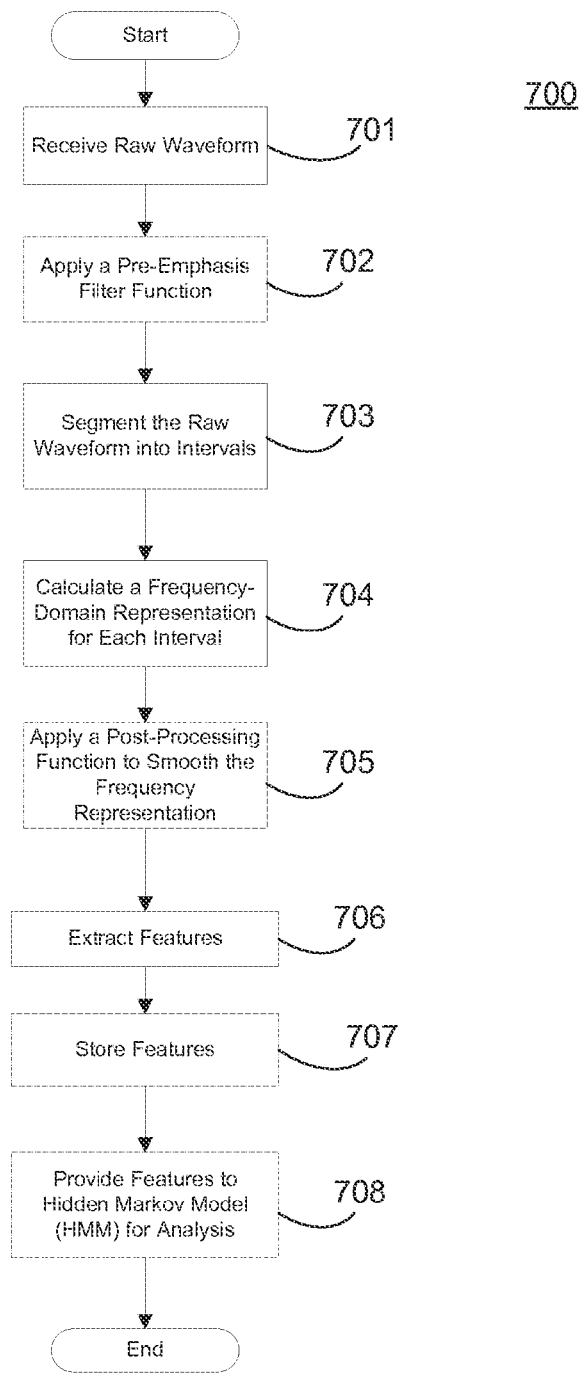
FIG. 7 illustrates a flow diagram for a process, implemented in certain embodiments, to anonymize a raw speech waveform.

With reference to the example process 700 of FIG. 7, at step 701 the system may receive a raw audio waveform. At step 702, the system may optionally apply a pre-emphasis filter function on the original waveform data to emphasize higher frequency components. At step 703, the system may segment the audio signal into a sequence of short intervals, using an appropriate windowing function. At step 704, for each window of the audio waveform, the system may calculate the window's frequency-domain spectrum by running a Fourier transform on the audio data. At step 705, the system may apply a post processing function to smooth the frequency data. For example, the system may use the Mel-frequency cepstral (MFC) method, which involves mapping the Fourier transformed data onto a perceptual scale of pitches called the Mel scale. The system may then take the logarithm and discrete cosine transform (DCT) of the resulting data.

At step 706, the system may extract the features as the frequencies of the first most significant peaks (or formants) in the spectrum. If using the MFC, the resulting features may be called Mel-frequency cepstral coefficients (MFCCs). These extracted features may be useful for identifying the spoken words in the audio, but may have little or minimal information regarding the identity of the speaker.

At step 707, the extracted features may be optionally stored for later use and/or analysis. For example, at step 708, the system may provide the extracted features to a HMM for analysis. Any relevant recognition and analysis method may be used, however. For example, Bayesian methods and analysis may be applied in lieu of, or in conjunction with, the HMM approach.

Application Specific Feature Extraction

Figure 8:
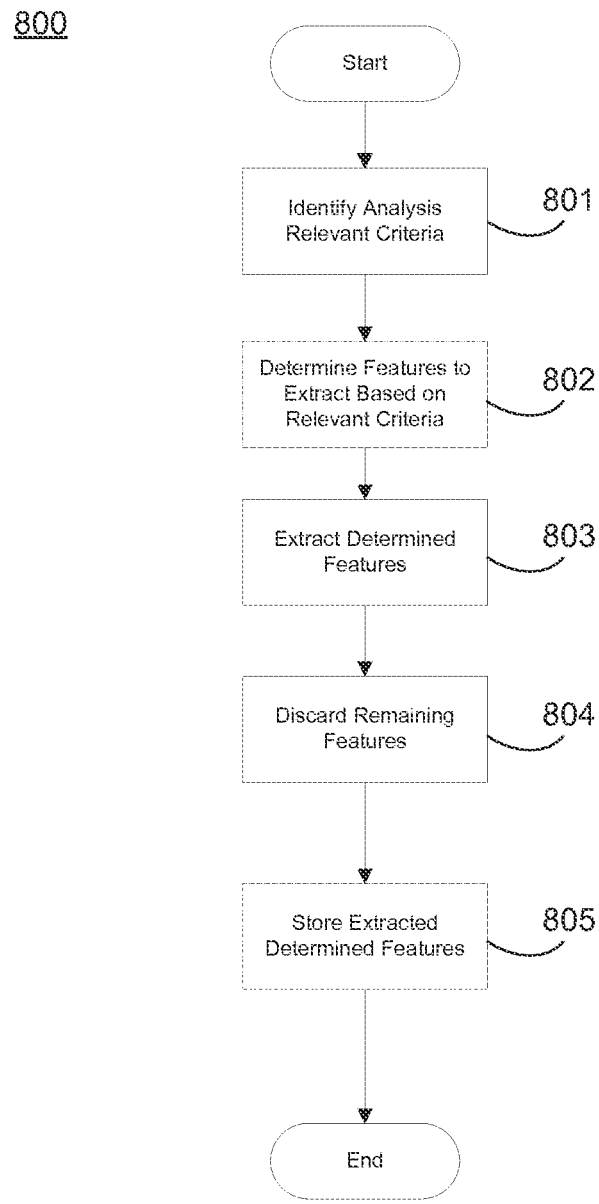
FIG. 8 illustrates a process flow diagram for a method to extract criteria relevant speech features when anonymizing a raw speech waveform in certain embodiments.

FIG. 8 illustrates a process flow diagram for a method to extract relevant speech features in certain embodiments. At step 801 the system may identify analysis relevant criteria. For example, the system may wish to identify emotional cues based on the character of the speech waveform from the user. By consulting database 107, the system may determine that certain features are relevant to this determination. At step 802 the system may determine the features to be extracted as those features which correspond to the relevant criteria. At step 803 the system may extract those features. Although step 803 refers to extracting the features that are to be retained, one will readily understand that certain embodiments may perform the converse. For example, rather than identify features to retain, the system may identify features to remove and may remove all but the desired features at step 803.

At step 804 of the depicted example, the system may discard the remaining features or a portion of the remaining features to anonymize the speech data. At step 805 the system may store the extracted features for further processing possibly by a third party as discussed above.

Additional Applications of Feature Extraction

In certain embodiments, by applying feature extraction to an audio waveform the system may remove frequencies that are not essential to the speech recognition process. Particularly, the system may remove personal information from an audio file. In certain embodiments, the feature extraction may also transform the audio data into a form that is not an audio format, e.g., it cannot be played back by standard audio players such as iTunes, QuickTime Player, or Windows Media Player.

An expert skilled in the field of signal processing may attempt to reverse the feature extraction process by applying an inverse Fourier transform on the feature vector and use a technology like a vocoder to resynthesize an audio waveform. The resulting audio file may be distinguishable as speech. However, because most of the frequencies have been removed from the spectra, the resulting speech may no longer sound anything like the original speaker. The modification may render it prohibitively difficult and/or impossible to uniquely identify the original speaker.

In effect, feature extraction followed by resynthesis may be an information destroying process. Nonetheless, certain embodiments contemplate further steps to further distance the resynthesized audio from the original speaker. For example:

1. Before passing the feature vector to the HMM stage the system may apply a normalization post process to account for the presence of noise, different speakers, different genders, or vocal tract length normalization. The system may apply one or more of these normalization steps to the feature vector in order to make the reconstructed audio sound like a more generic nonspecific human speaker. Application server 101 may direct the third party system how many times to perform the normalization of a given audio data.

2. In some embodiments, as an alternative to trying to normalize the data, certain embodiments contemplate the addition of new nonspecific components into the data to further mask the profile of the original speaker. For example, white noise frequencies could be added in the frequency domain to distort and obfuscate the identity of the original speaker when transformed back into the time domain. Application server 101 may direct the third party system regarding what components to add and in what quantity to a given audio data.

3. Some embodiments may employ speaker de-identification that attempts to transform spectral features in such a manner that any reconstructed voice is made to sound intelligible but does not reveal the identity of the speaker. These techniques may be employed in conjunction with the techniques disclosed herein.

Computer System Overview

Figure 9:
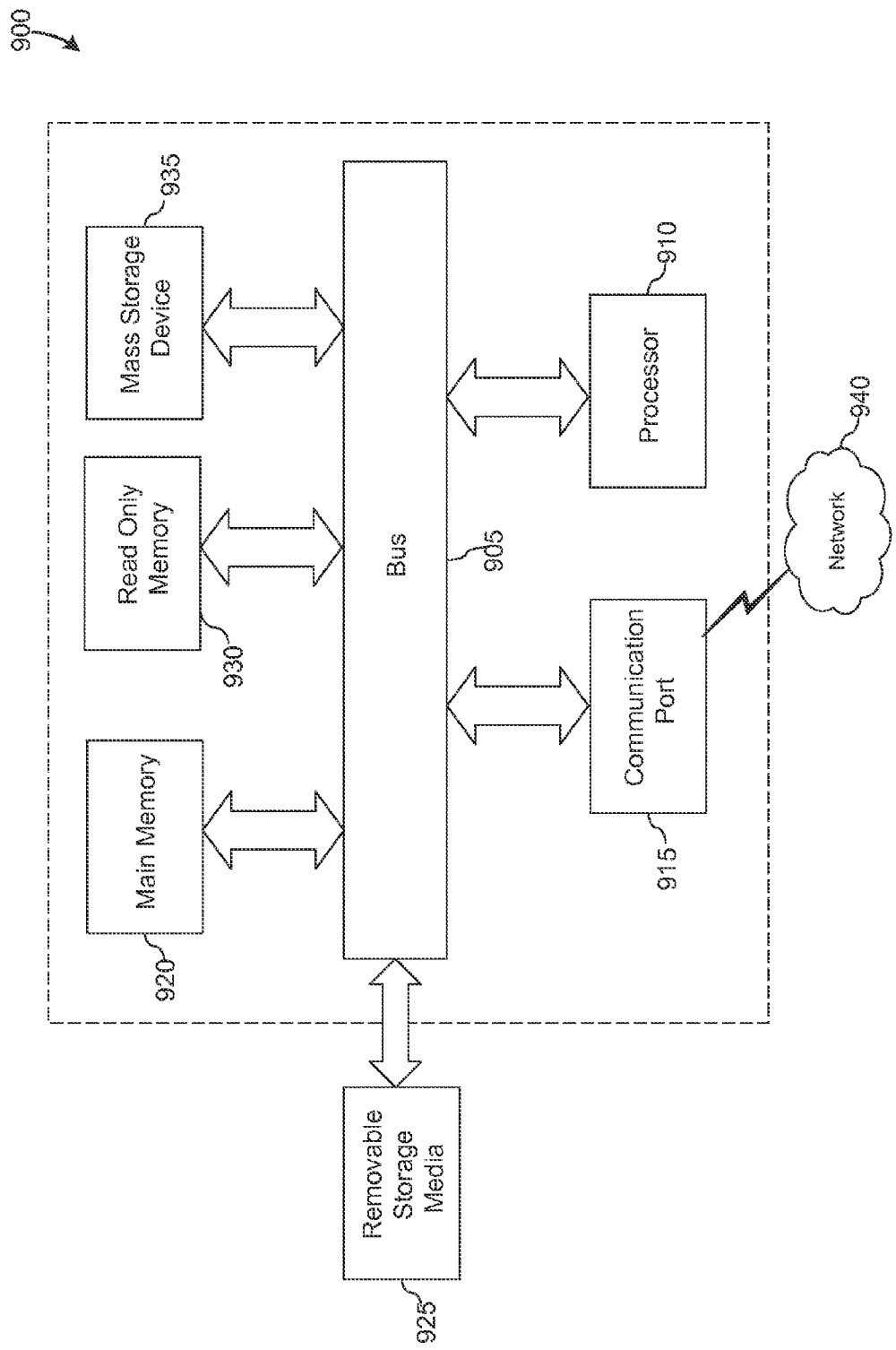
FIG. 9 is a block diagram of a computer system as may be used to implement features of certain of the embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which various embodiments may be utilized. Various of the disclosed features may be located on computer system 900. According to the present example, the computer system includes a bus 905, at least one processor 910, at least one communication port 915, a main memory 920, a removable storage media 925, a read only memory 930, and a mass storage 935.

Processor(s) 910 can be any known processor, such as, but not limited to, an Intel® Itanium® or Itanium 2® processor(s), or AMD® Opteron® or Athlon MP® processor(s), or Motorola® lines of processors. Communication port(s) 915 can be any of an RS-232 port for use with a modem based dialup connection, a 10/100 Ethernet port, or a Gigabit port using copper or fiber. Communication port(s) 915 may be chosen depending on a network such a Local Area Network (LAN), Wide Area Network (WAN), or any network to which the computer system 900 connects.

Main memory 920 can be Random Access Memory (RAM), or any other dynamic storage device(s) commonly known in the art. Read only memory 930 can be any static storage device(s) such as Programmable Read Only Memory (PROM) chips for storing static information such as instructions for processor 910.

Mass storage 935 can be used to store information and instructions. For example, hard disks such as the Adaptec® family of SCSI drives, an optical disc, an array of disks such as RAID, such as the Adaptec family of RAID drives, or any other mass storage devices may be used.

Bus 905 communicatively couples processor(s) 910 with the other memory, storage and communication blocks. Bus 905 can be a PCI/PCI-X or SCSI based system bus depending on the storage devices used.

Removable storage media 925 can be any kind of external hard-drives, floppy drives, IOMEGA@ Zip Drives, Compact Disc-Read Only Memory (CD-ROM), Compact Disc—Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Remarks

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method comprising:
receiving a raw audio waveform from a user device, where the raw audio waveform is recorded by the user device and contains speech data of a user;
providing metadata and the raw audio waveform to a third-party processing system,
where the metadata identifies one or more frequency components to be redacted from a frequency representation of the raw audio waveform;
directing the third-party processing system to perform an operation on the raw audio waveform, wherein the operation includes:
generating the frequency representation of the raw audio waveform,
removing the one or more frequency components from the frequency representation that identify the user to produce a modified frequency representation, and
generating an anonymized audio waveform from the modified frequency representation,
where the third-party processing system is only allowed to perform speech processing on anonymized portions of the raw audio waveform;
allowing the third-party processing system to copy elements of the anonymized audio waveform to improve a model employed by the third-party processing system to identify speech within audio waveforms;
receiving a textual depiction of speech in the anonymized audio waveform from the third-party processing system; and
performing a system operation based on the textual depiction.

2. The method of claim 1, wherein removing the one or more frequency components from the frequency representation renders at least one technique for identifying the user from a reconstructed audio waveform less effective.

3. The method of claim 1, wherein the system operation includes determining a responsive action for a synthetic character with which the user can interact.

4. The method of claim 1, wherein the third-party processing system comprises a speech processing software module.

5. The method of claim 1, wherein the third-party processing system comprises a server.

6. The method of claim 1, wherein the textual depiction comprises a string of characters.

7. The method of claim 1, wherein the textual depiction includes Natural Language Processing information that is used to perform the system operation.

8. A computer-implemented method for processing speech data, the method comprising:
receiving, by an application server operated by an entertainment service, a raw audio waveform containing speech data of a user, where the raw audio waveform is transmitted to the application server by a user device;
generating a frequency representation of the raw audio waveform;

removing a feature from the frequency representation that can be used to identify the user to produce a modified frequency representation;

generating an anonymized representation of the raw audio waveform from the modified frequency representation;

providing metadata and the anonymized representation to a speech processing module executing on the application server for processing, where the metadata identifies the feature that was removed from the frequency representation, where the speech processing module is operated by a third-party speech processing service, and where the speech processing module is allowed to copy elements of the anonymized representation to improve speech processing operations performed by the speech processing module;

receiving a processed version of the anonymized representation from the speech processing module; and performing a system operation using the processed version of the anonymized representation.

9. The method of claim 8, wherein the system operation includes producing a textual depiction of speech in the anonymized representation.

10. The method of claim 9, wherein producing the textual depiction comprises generating a Natural Language Processing description of at least a portion of the raw audio waveform.

11. The method of claim 8, wherein generating the frequency representation comprises generating a spectral decomposition of the raw audio waveform, and wherein removing the feature from the frequency representation comprises removing at least one frequency component from the spectral decomposition that identifies the user.

12. The method of claim 8, wherein generating the anonymized representation comprises generating a feature vector representation of a plurality of frequencies derived from the raw audio waveform.

13. A computer-implemented method for anonymizing speech data, the method comprising:

receiving a raw audio waveform containing speech data of a user;

segmenting the raw audio waveform into a plurality of intervals;

generating a frequency domain representation of each interval;

applying a post-processing function to smooth each frequency domain representation and remove at least a portion of speaker-identifying data from each frequency domain representation;

identifying a frequency component in one of the plurality of intervals that represents a spoken word in the raw audio waveform and cannot be used to identify the user;

extracting the frequency component from the corresponding interval;

providing metadata and the frequency component to an analysis system for processing, where the metadata identifies the speaker-identifying data removed from each frequency domain representation by the post-processing function;

receiving, from the analysis system, processed data; and determining, for a synthetic character, an appropriate emotional state or responsive action based at least in part on the processed data.

14. The method of claim 13, further comprising performing at least one of noise removal, speaker removal, or vocal tract length normalization to make an audio file reconstructed from the component sound like a generic, nonspecific human speaker.

15. The method of claim 13, wherein the post-processing function comprises the addition of certain nonspecific frequency components into each of the frequency domain representations.

16. The method of claim 13, wherein extracting the frequency component comprises analyzing data provided from a speech database.

17. An application server for performing speech processing in accordance with a privacy regulation, the application server comprising:

a processor;

a first communication port configured to establish a first connection with a user device across a first network;

a second communication port configured to establish a second connection with a speech processing server across a second network; and a memory coupled to the processor and configured to store instructions, which, when executed by the processor, cause the processor to perform operations including:

receiving, via the first communication port, a raw audio waveform from the user device that includes speech data of a user;

generating a frequency representation of the raw audio waveform;

removing one or more frequency components from the frequency representation that can be used to identify the user to produce a modified frequency representation;

generating an anonymized waveform from the modified frequency representation;

transmitting, via the second communication port, metadata and the anonymized waveform to the speech processing server for processing, where the metadata identifies the one or more frequency components that were removed from the frequency representation, and where, upon completion of a speech processing operation, the speech processing server is allowed to copy elements of the anonymized waveform to improve an audio model employed by the speech processing server to identify speech within audio waveforms;

receive, via the second communication port, a textual depiction of speech in the anonymized waveform from the speech processing server;

determining a responsive action for a synthetic character based at least in part on the textual depiction, where the synthetic character is presented to the user by the user device;

transmitting, via the first communication port, an instruction indicative of the responsive action to the user device; and causing the user device to execute the instruction, which prompts the synthetic character to perform the responsive action.

18. The application server of claim 17, wherein the first network and the second network are a same network.

19. A computer-implemented method for processing speech data in accordance with a privacy regulation, the method comprising:

receiving, from a user device executing an entertainment application, a raw audio waveform that includes speech data of a user, wherein the raw audio waveform is recorded by the user device in response to the user interacting with the entertainment application;

providing metadata and the raw audio waveform to a speech processing environment controlled by a third party for processing,
- where the metadata identifies a frequency component of a frequency representation of the raw audio waveform that is to be modified;

directing the third party to perform an anonymization operation on the raw audio waveform before performing a speech processing operation, wherein the anonymization operation includes
- generating the frequency representation of the raw audio waveform,
- modifying the frequency component of the frequency representation that could be used to identify the user in order to produce a modified frequency representation, and
- generating an anonymized representation of the raw audio waveform from the modified frequency representation;

allowing the third-party speech processing system to copy an element of the anonymized representation to improve future instances of speech processing;

receiving, from the speech processing environment, a textual depiction of speech in the anonymized representation of the raw audio waveform;

determining a responsive action for a synthetic character based at least in part on the textual depiction; and transmitting, to the user device, an instruction indicative of the responsive action for execution by the user device, wherein execution of the instruction causes the synthetic character to perform the responsive action within the entertainment application.

20. The method of claim 19, wherein said modifying includes:
- adding a new frequency component to the frequency representation;
- removing an existing frequency component from the frequency representation; or
- altering an existing frequency component of the frequency representation.

21. The method of claim 19, wherein the speech processing environment comprises a speech processing software module.

22. The method of claim 19, wherein the speech processing environment comprises a server, and wherein providing the raw audio waveform to the speech processing environment requires the raw audio waveform be transmitted to the server over a network.

* * * * *